Figure 1:
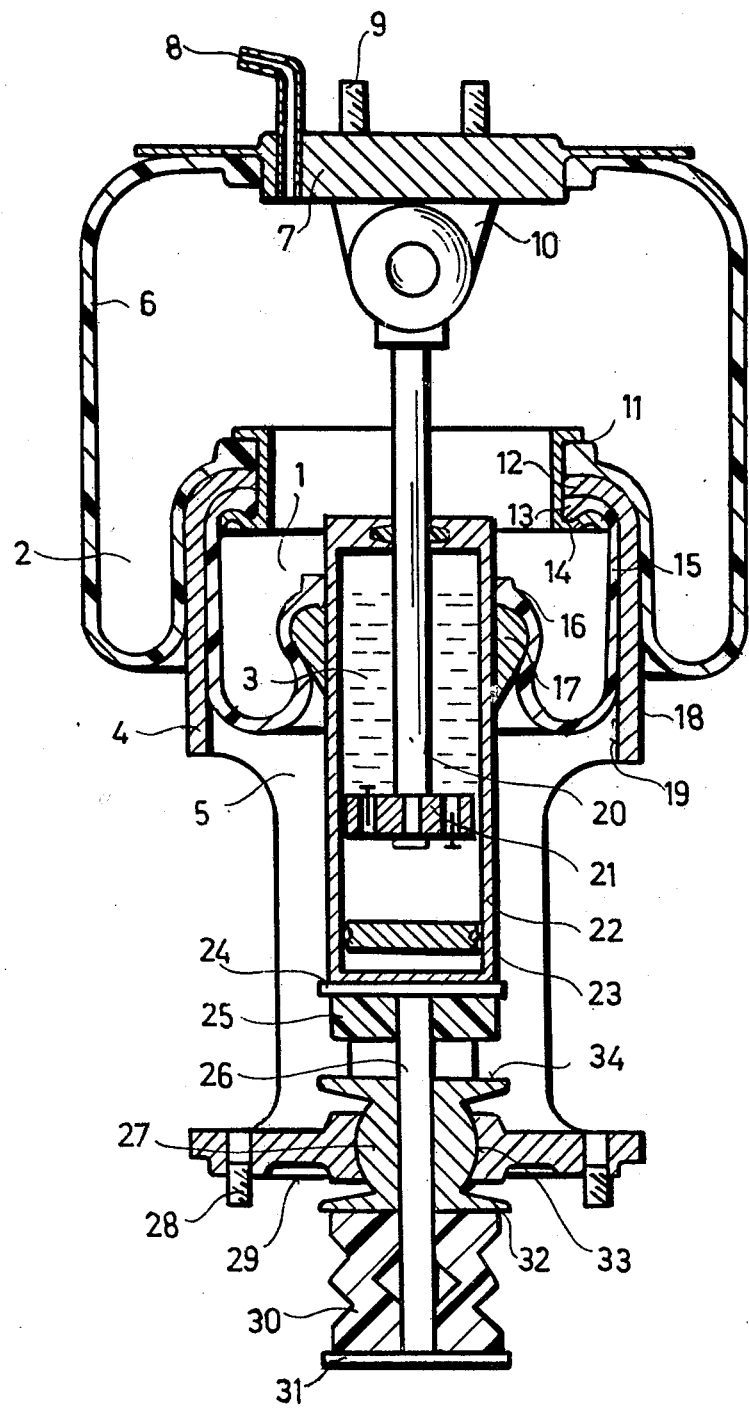

United States Patent [19]

Korosladanyi et al.

[11] 4,325,541
[45] Apr. 20, 1982

[54] SPRING LEG WHICH HAS A LOAD PROPORTIONALLY LIMITED DAMPING, CONSISTING OF AN AIR SUSPENSION AND A TELESCOPIC SHOCK ABSORBER FOR MOTOR VEHICLE

[75] Inventors: Jozsef Korosladanyi; Sandor Szabo; Jeno Madi, all of Budapest; Laszlo Vad, Visgrad; Otto Farkas, Budapest, all of Hungary

[73] Assignees: Autoipari Kutato Intezet; Taurus Gumiipari Vallalat, both of Budapest, Hungary

[21] Appl. No.: 138,495

[22] Filed: Apr. 9, 1980

Related U.S. Application Data

[63] Continuation of Ser. No. 919,942, Jun. 28, 1978, abandoned.

[30] Foreign Application Priority Data

Jun. 30, 1977 [HU] Hungary .............................. AU 337

[51] Int. Cl.³ ................................................ F16F 9/08
[52] U.S. Cl. ............................... 267/8 R; 267/DIG. 1; 267/64.21; 280/711
[58] Field of Search ...................... 267/64 B, 65 B, 35, 267/152, DIG. 1, DIG. 2, 8 R; 280/711, 712; 188/321

[56] References Cited

U.S. PATENT DOCUMENTS 3,178,167  4/1965  Loewis ........................... 188/269 X
3,653,651  4/1972  Allinquant et al. ............... 267/64 B

FOREIGN PATENT DOCUMENTS 217855   2/1957  Australia ............................ 267/64 B
2335747  7/1977  France ................................. 188/321
171203  12/1934  Switzerland ........................ 188/322
906550   9/1962  United Kingdom .................. 267/35

Primary Examiner—George E. A. Halvosa
Attorney, Agent, or Firm—Gabriel P. Katona

[57] ABSTRACT

A spring leg with load proportional limited damping for use on a vehicle, includes a telescoping shock absorber including a piston and cylinder and a load bearing air suspension connected to a gas pressure system and having the walls surrounding the air space thereof comprising an elastic jacket and two rigid walls fixed to the body and the axle gear of the vehicle wherein the binding units of the shock absorber are partly arranged in the air space of the air suspension. An auxiliary diaphragm has an inner rim fixed to the cylinder of the shock absorber and an outer rim fixed to one of the two rigid walls of the air suspension to define the auxiliary diaphragm as one of the bordering walls, of the air space of the air suspension. A pilot ring limits the outward movement of the cylinder of the telescopic hydraulic shock absorber from the air space of the air suspension and is fixed to the rigid wall bearing the outer rim of the auxiliary diaphragm. A bearing ring is arranged on the cylinder of the shock absorber with the piston rod of the shock absorber and is fixed to the other rigid wall of the air suspension.

6 Claims, 3 Drawing Figures

SPRING LEG WHICH HAS A LOAD PROPORTIONALLY LIMITED DAMPING, CONSISTING OF AN AIR SUSPENSION AND A TELESCOPIC SHOCK ABSORBER FOR MOTOR VEHICLE

This is a continuation of Ser. No. 919,942, filed on June 28, 1978, now abandoned.

The subject of the present invention is a spring leg for the running gear of motor vehicles, which has an air suspension and a one-way hydraulic telescopic shock absorber, wherein the damping force of the shock absorber varies according to the load of the spring leg or that of the vehicle.

A known version of shock absorbing of motor vehicles is one in which damping of the body bouncing is achieved by an air suspension mounted between the body and the running gear and a hydraulic telescopic shock absorber connected parallel to the air suspension.

Constant height of the body, independent of the load of the vehicle can be achieved by interposing an air suspension level control valve, and as a consequence of the characteristic of the air suspension, the natural frequency of the vehicle can be favourably low.

The damping force of a hydraulic shock absorber is proportional to the relative velocity of the body and the running gear, such as the front and rear axles and the kinetic energy of the bouncing of the vehicle is transformed into heat.

There are well known spring leg arrangements in which the shock absorber and the air suspension are combined into one unit. Such arrangements of hydropneumatic spring legs are disclosed in West German Patent Specification No. 1,152,316 and No. 1,184,225.

Both arrangements comprise a rolling diaphragm air suspension mounted on the shock absorber in such a way that one side of the rolling diaphragm air suspension is fixed to the end of the piston rod connected to the vehicle, while the other side of the rolling diaphragm is connected to the cylinder of the shock absorber linked to the running gear, and the construction of the cylinder enables the diaphragm to roll along the cylinder jacket during bouncing.

The advantages of the above-mentioned one-unit type spring leg arrangements—compared to separately mounted air suspensions and shock absorbers—are the smaller size, easier assembling to the vehicle, the arrangement can be simpler since the common influence line of the spring and the damping force does not produce any torque, and the piston of the shock absorber is better protected against dust, thus improving duration. On the other hand, it is unfavourable that the load of each element of the shock absorber increases and a failure of the shock absorber can also cause damage to the rolling diaphragm.

An unfavourable characteristic of both, the traditionally separately mounted air suspension and shock absorber and the above-mentioned one-unit type hydropneumatic spring leg arrangements is that, while the shock absorbing characteristics of the air suspension is influenced—with the help of a level control valve—in accordance with the variation of the load of the vehicle, the effect of the hydraulic shock absorber is independent of the load, that is to say the damping force is a function of only the velocity of bouncing. It follows that, if shock absorption of a vehicle is adjusted to optimum at full load, then it will become overdamped in partial load which causes inconveniences.

Our aim was to develop a hydropneumatic spring leg in which the extent of damping, that is to say the damping force, varies in accordance with the load of the spring leg or with that of the vehicle.

The aim of our invention was achieved by not fixing either the cylinder or the piston rod of the shock absorber—preferably not fixing the cylinder—to the running gear or to the body, but loading it by the pressure of the air space of the air suspension with the help of an auxiliary diaphragm, which means that at resting position it bears up against the element which is to be damped, but it also can move away.

When the relative bouncing velocity of the running gear and the body is higher than the so-called limit velocity at which the damping force, which is proportional to the velocity, is equal to the supporting force of the auxiliary diaphragm, the cylinder moves away from its resting position and the shock absorber moving with this limit velocity will provide a damping force and its value is determined by the auxiliary diaphragm.

When the relative velocity of the running gear and the body decreases below the limit velocity, the cylinder of the shock absorber will be again in its resting position.

Since usually the air pressure of the air suspension changes according to the load of the body—with the help of the level control valve—the damping force limited by the auxiliary diaphragm is also proportional to the load of the spring leg.

Our invention is a spring leg which has a load proportionally limited damping, consisting of a one-way hydraulic telescopic shock absorber and a load bearing air suspension with a junction to a gas pressure system, the wall of the air space of the air suspension is made of an elastic jacket and rigid walls which are fixed to the running gear and the body, and the elements of the shock absorber are placed partly into the air space of the air suspension, the inner rim of the auxiliary diaphragm is fixed to the cylinder of the hydraulic telescopic shock absorber, the outer rim is fixed to one of the above-mentioned rigid walls of the air suspension, and at the same time it serves as one of the boundaries of the air space of the air suspension, the stop piece limiting the outward movement of the cylinder of the telescopic shock absorber from the air space of the air suspension is fixed to the rigid wall, bearing the outer rim of the auxiliary diaphragm, the counter stop piece is fixed on the wall of the cylinder of the shock absorber, while the piston rod of the shock absorber is fixed to the other rigid wall of the air suspension.

At an advantageous construction of our invention both the elastic jacket of the air suspension and the auxiliary diaphragm are rolling diaphragms, the piston of the air suspension arranged on a piston column which has fixing elements connected to the running gear, in the piston column there is the counter stop piece of the end face which serves as a supporter surface of the shock absorber cylinder, and the piston rod of the shock absorber is connected to the rigid wall of the air suspension fixable to the body.

In another advantageous construction of our invention—in which the piston rod of the shock absorber is fixed to the running gear and there is enough space for the pilot pin and the stop elements of the cylinder of the shock absorber to arrange them inside the body, above the rim of the air suspension which is connected to the body—one of the rigid walls of the load bearing air suspension is arranged as a piston of the rolling diaphragm which is fixed to the running gear, the piston rod of the shock absorber is connected to the piston of the air suspension, the air suspension has an auxiliary piston arranged as a rigid wall fixable to the body on which the outer rim of the auxiliary diaphragm is fixed as a sealing, the counter stop piece of the end face serving as a supporting surface of the shock absorber cylinder is placed into the above-mentioned rigid wall of the air suspension and there is a pilot pin in a pilot bush fixed to the end face of the shock absorber cylinder which serves as a supporting surface and has an elastic bearing pulley, the end face of the pilot bush serves as the counter stop of the above-mentioned bearing pulley, there is a buffer disk on the end of the pilot pin overhanging the pilot bush to limit the stretching out, and on the buffer disc there is a buffer spring supported by the end face of the pilot bush.

In another construction of the present invention the outer rim of the auxiliary diaphragm is sealingly fixed to the rim of the piston of the air suspension which is connected to the running gear, in the outer rim of the auxiliary diaphragm there are drift holes for the elastic stop rings encircling the stop collars of the shock absorber cylinder limiting its motion, in the rim of the shock absorber cylinder there is a channel to connect the air spaces separated by the rim of the piston of the air suspension, and the piston rod of the shock absorber is connected to an upper air suspension armature which can be fixed to the body. This construction provides the smallest mounting height compared to any other solutions mentioned above.

The telescopic hydraulic shock absorber used in the spring leg according to the present invention is a one-way shock absorber which means that its damping force is much higher at stretching than at compressing provided that the bouncing velocity is the same. The load dependent limitation of damping force generated practically at only stretching provides almost equal damping at partial load as at full load. The extreme positions of stretching and compressing of the spring leg are also limited. The stroke of the shock absorber built into the spring leg is shorter than the total springing way of the spring leg, and this difference is equal to or bigger than the amplitude of bouncing of the running gear on a flat road surface caused by the elasticity of the tires and by the unbalanced wheels.

At a suitable construction of the shock absorber, its cylinder is finned or has a finned cooling head for sufficient cooling.

Figure 2:
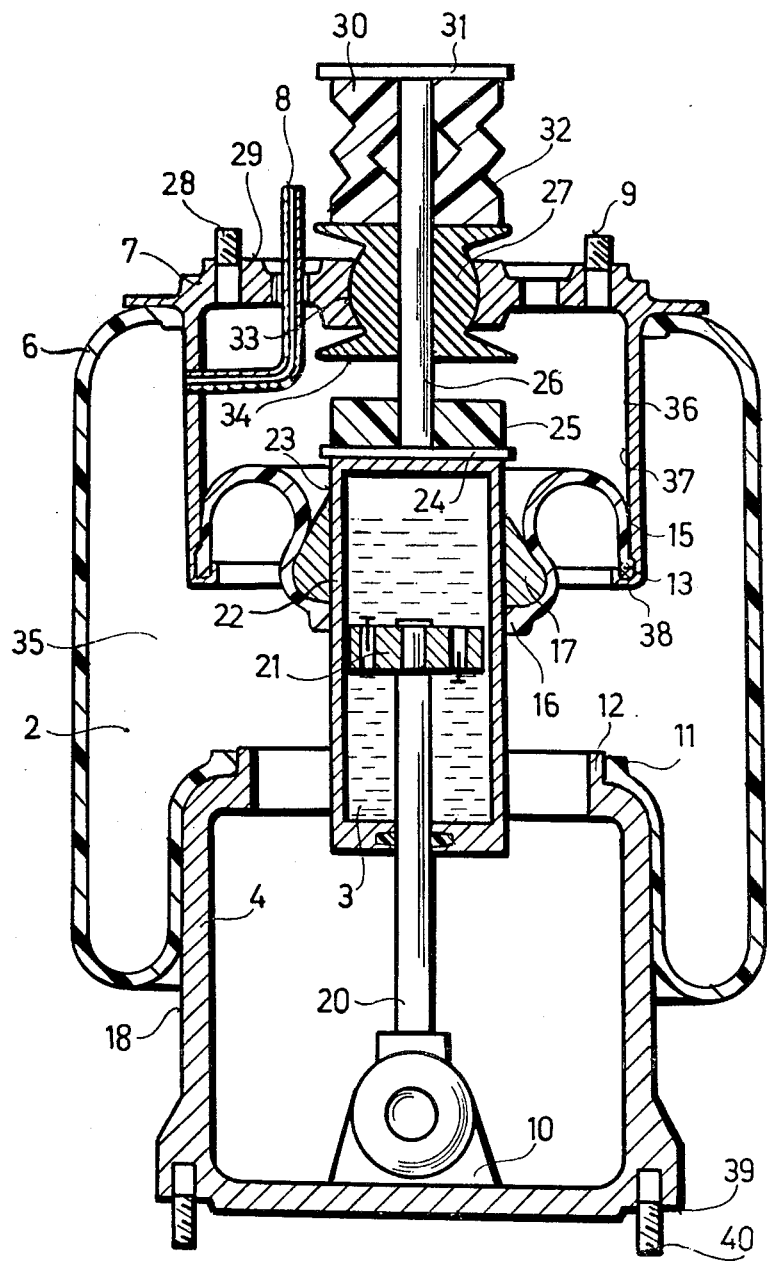
Figure 3:
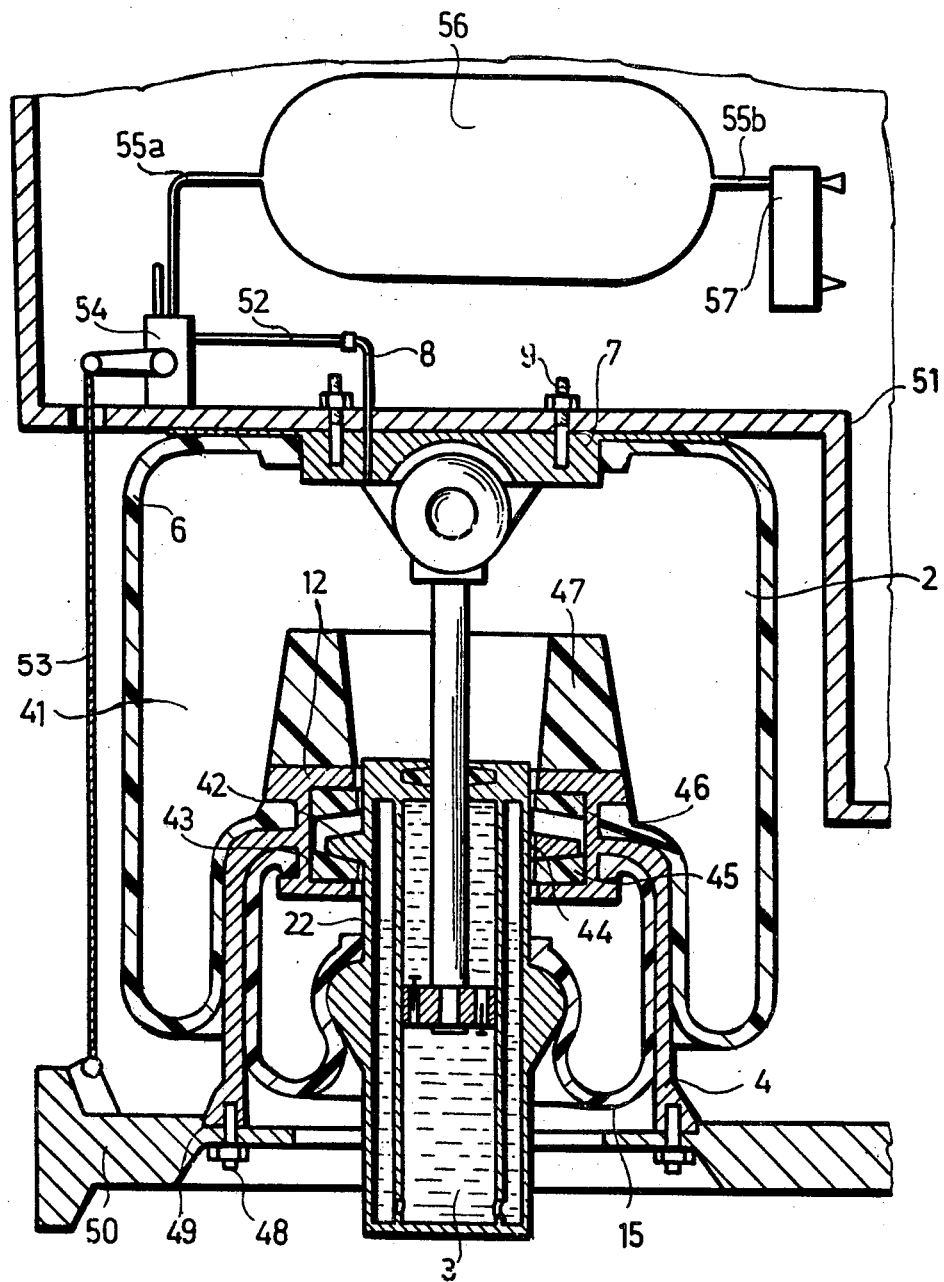

Our invention will now be described in greater details by way of example, with references to the accompanying drawings in which:

FIG. 1 shows the axial section of the spring leg in which the piston rod of the shock absorber is fixed to the upper armature of the air suspension, FIG. 2 shows the axial section of the spring leg in which the piston rod of the shock absorber is fixed into the piston of the air suspension, FIG. 3 shows the axial section of a further construction of the spring leg built into a motor vehicle.

FIG. 1 shows the axial section of the spring leg according to the present invention. The spring leg 1 consists of three main parts, the air suspension 2, the shock absorber 3 and the piston column 5 on which the different elements are built. The air suspension 2 of construction shown in the FIG. 1 is a rolling diaphragm type air suspension and its rigid wall which is connected to the body of the vehicle unshown, is made to be an upper armature 7 which has bolts 9 for clamping. The air connecting branch 8 of the air suspension 2 is placed on the upper armature 7. The rolling diaphragm 6 is sealingly fixed on the upper armature 7 and during operation it rolls down on the outer jacket 18 of the piston 4 of the piston column 5, and the inner rim 11 of the rolling diaphragm 6 is sealingly fixed on the rim 12 of the air suspension piston 4 by a locking ring 14. The same locking ring 14 fixes and seals the outer rim 13 of the auxiliary diaphragm 15, while its inner rim 16 is fixed to the cylinder 22 of the air suspension 3 or to its collar 17. The auxiliary diaphragm 15 rolls on the inner jacket 19 of the air suspension 4 and on the outer jacket 23 of the shock absorber cylinder 22.

The construction of the shock absorber 3 is a well known telescopic, one-way type shock absorber. The piston rod 20 is connected to the block 10 of the upper armature 7. The force generated on the piston 21 which is arranged on the piston rod 20 is the cylinder 22 and has valves, is much greater at stretching than at compressing so in practice it is considered to be a so-called one-way shock absorber. The pilot pin 26 which is an extension of the cylinder 22 of the shock absorber 3 is guided in the pilot bushing 27. In the spherical seating 33 of the piston column 5 pilot bushing 27 is fixed and both its end faces 32 and 34 serve as bearing and stopping faces. The end face 34 is the counter surface of the bearing rim 24 of the shock absorber cylinder 22 or that of the elastic bearing pulley 25 arranged on the bearing rim 24, and the stopping end face 32 is the counter surface of the stopping pulley 31 which limits the stretching and is at the end of the pilot pin 26. There is a buffer spring 30 between the stopping pulley 31 and the pilot bushing 27. The piston column 5 has connecting rim 29 with bolts for clamping the spring leg 1 to the running gear. The stretching of the spring leg 1 is limited by the stopping pulley 31 of the shock absorber 3, which means that the springing way of the spring leg 1 is longer than the displacement of the shock absorber 3. The surface of the auxiliary diaphragm 15 is chosen to be approximately one-third of the effective surface of the rolling diaphragm 6 and its displacement is one-fifth of the total springing way.

The operation of the spring leg 1 is as follows:

The air suspension 2 of the spring leg 1 is filled up through the air connecting branch 8 to the operating pressure by the air system of the vehicle and the control valve, not shown in the drawing, provides a determined body height independent of the load. The air pressure of the air suspension 2 depends on the load or is proportional to it. At normal bouncing (at compression) the upper armature 7 and the air suspension piston 4 come nearer to each other, the volume of the air suspension 2 becomes smaller and the rolling diaphragm 6 rolls on the outer rim 18 of the air suspension piston 4. The pressure increases according to the decreasing volume, and the increasing pressure exerts increasing spring force to the effective surface of the rolling diaphragm 6 of the air suspension 2. The same pressure effecting the auxiliary diaphragm 15 wants to hold down the cylinder 22 of the shock absorber 3 to the piston column 5, while the damping force of the shock absorber 3 acts into the opposite direction. As long as the force on the shock absorber cylinder 22 exerted by the auxiliary diaphragm 15 is bigger than the damping force, the elastic bearing pulley 25 is held down on the piston column 5. The increasing of the bouncing velocity produces a state of dynamic equilibrium at which the force on the shock absorber cylinder 22 transmitted by the auxiliary diaphragm 15 is equal to the damping force. At this state the force holding the shock absorber cylinder 22 down to the piston column 5 ceases, and in the case of increasing bouncing velocity the movement of the shock absorber cylinder 22 falls behind the piston column 5 or behind the running gear, and the shock absorber cylinder 22 will rest again on the piston column 5 and move together with it when the bouncing velocity decreases under the above-mentioned limit value. The movement of the shock absorber cylinder 22 relative to the piston cylinder 5 is made possible by the auxiliary diaphragm 15 which is made to be a rolling type diaphragm, rolling on the inner jacket 19 of the air suspension piston 4 and on the outer jacket 23 of the shock absorber cylinder 22.

As a result of this mode of operation the damping force at the springing out of the running gear cannot exceed the value determined by the air pressure of the auxiliary diaphragm 15 and the air suspension 2. Since, at stretching, the static pressure is proportional to the load of the spring leg 1, the load proportional limitation of the damping force is ensured. The dynamic variation of the pressure—at bouncing—has little effect on the load proportional limitation because the variation of the pressure of the air suspension is only about ±10% of the static pressure in most practical cases and because the bouncing velocity lags in phase behind the bouncing way. It follows that great bouncing velocities occur around the mid-position (operational basic position) when the dynamic air pressure is near to the static pressure. The limitation of the damping force is needed at higher bouncing velocities which is ensured this way. At stretching—i.e. when the running gear moves away from the body of the motor vehicle—the force exerted on the body of the motor vehicle by the spring leg 1 is equal to the difference between the spring force of the air suspension 2 and the load proportionally limited damping force of the shock absorber 3. The stretching of the spring leg 1 is limited by the fact that the stroke of the shock absorber 3 is shorter than the springing way of the spring leg 1 and in a totally pulled out position first the piston 21 of the shock absorber cylinder 22 moves away in the pilot bushing 27, compresses the rubber spring 30, then the shock absorber cylinder 22 abuts on the stopping pulley 31.

A simple construction of the spring leg according to the present invention makes load proportional control of the damping force possible, moreover it requires small space because the air suspension and the shock absorber are built together, the piston rod of the shock absorber operates in a clean environment, and there is no torque between the two suspension elements because the air suspension and the shock absorber are concentrically built together.

In the construction shown in FIG. 2 the cylinder 22 of the shock absorber 3 built into the spring leg 35 is fixed to the body of the motor vehicle and the piston rod 20 is fixed to the running gear. In the inner space of the rolling diaphragm 6, there is the auxiliary piston 36 which is a part of the upper armature 7 holding the outer rim 13 of the auxiliary diaphragm 15 fixed to the rim 38 of the auxiliary piston 36. The auxiliary diaphragm 15 rolls on the inner jacket 37 of the auxiliary piston 36. The pilot pin 26 of the cylinder 22 of the shock absorber 3 is guided in the pilot bushing 27 mounted in the upper armature 7.

The air suspension piston 4 can be fixed to the running gear element with the help of the bolts 40 mounted on the connection rim 39.

The operation of the spring leg 35 is exactly the same as that of the spring leg 1 shown in FIG. 1. The space requirements of the two, spring legs 1 and 35, are the same. Choosing between these two spring legs one can consider whether the pilot pin 26 and the damping spring 30 can be built into the running gear or into the body more easily.

In FIG. 3 there is a spring leg built into a vehicle. The main advantage of the spring leg 41 shown in FIG. 3, compared to the spring legs 1 and 35 is its longitudinal size, that is to say, its size in the direction of the axis of the shock absorber is smaller than that of the former ones. The difference is equal to the common length of the pilot pin 26 and the stopping pulley 31 according to FIG. 2. The upper armature 7 is fixed to the body 51 by bolts 9, and the connection rim 49 of the suspension piston 4 is fixed to the bridge body 50 by bolts 48.

The air system feeding the air suspension consists of a compressor 57, a duct 55b connecting the compressor 57 to the receiver 56, a duct 55a connecting the receiver 56 to the level control valve 54. The pressure junction 8 of the air suspension 2 is connected through a duct 52 to the level control valve 54 which is connected to the bridge body 50 by a bar 53.

The difference between the spring leg 41 and the spring leg 1 shown in FIG. 1 is that there is a stop collar 42 on the cylinder 22 of the shock absorber which is encircled by two elastic bearing rings 45 and 46 for limiting its displacement, and the bearing rings 45 and 46 are embedded in the slot 43 of the rim 12 of the air suspension cylinder 4. There is a stop rubber 47 placed on the air suspension cylinder 4 for limiting the springing of the spring leg 41. The distance between th two bearing rings 45 and 46 is chosen to be equal to or bigger than the amplitude of the running gear bouncing on flat road surface caused by the elasticity of the tires and the unbalanced wheels.

There is a piercing 44 on the stopping collar 42 to provide a permanent connection between the upper and lower air space of the air suspension 1. The operation of the spring leg 41 is just the same as that of the spring leg 1 shown in FIG. 1.

When the vehicle is out of operation the upper armature 7 is supported on the stopping rubber 47 which limits the springing. When the vehicle is started, the air compressor 57 fills up the receiver 56 and the air enters the air suspension 2 through the level control valve 54 as long as the level reaches the adjusted valve which is independent of the load of the vehicle. When the level reaches the preadjusted value, the level control valve 54 closes and remains closed within a predetermined springing way. In this way the pressure in the air suspension 2 is proportional to the load and the force exerted on the auxiliary diaphragm 15 is also proportional to the air pressure. At resting position the stop collar 42 of the cylinder 22 of the shock absorber 3 is supported on the bearing ring 45. In this state the pressure between the upper and lower air space of the air suspension 2 separated by the stop collar 42 can be equalized through the piercing 44. When the body 51 and the bridge body 50 move away the method of operation of the spring leg is just the same as was described above in connection with FIG. 1.

What we claim is:

1. In a spring leg with load proportional limited damping for use on a vehicle, including a telescoping shock absorber including a piston and cylinder and a load bearing air suspension connected to a gas pressure system and having walls surrounding the air space thereof comprising two rigid walls fixed to the body and the axle of the vehicle and an elastic jacket connected to the two rigid walls, the improvement comprising means mounting the cylinder for movement relative to one of the two rigid walls comprising an auxiliary diaphragm having an inner rim fixed to the cylinder of the shock absorber and an outer rim fixed to said one of the two rigid walls of the air suspension to define the auxiliary diaphragm as one of the bordering walls of the air space of the air suspension, means for limiting the outward movement of the cylinder of the shock absorber from the air space of the air suspension, the limiting means comprising a pilot bushing fixed to the one rigid wall bearing the outer rim of the auxiliary diaphragm and wherein the piston rod of the shock absorber is fixed to the other rigid wall of the air suspension, wherein both the elastic jacket of the air spring and the auxiliary diaphragm comprise rolling diaphragms and the one rigid wall has fixing elements connected to the axle and a stop collar for the shock absorber and wherein the outer rim of the auxiliary diaphragm is sealingly fixed to the one rigid wall of the air suspension and in which there is a slot bearing elastic stopping rings which encircle the stop collar of the shock absorber and limit the displacement of the shock absorber cylinder and wherein the shock absorber cylinder has a rim including a channel which connects the air spaces divided by the rim of the air suspension cylinder.

2. A spring leg according to claim 1, wherein the one rigid wall forms a piston for the air suspension with one rolling diaphragm and is arranged on a piston column which has the fixing elements connected to the axle, the pilot bushing is fixed into the piston column and the piston rod of the shock absorber is connected to the rigid wall of the air suspension which is connected to the body.

3. A spring leg according to claim 1 or claim 2, wherein the stroke of the spring leg is about 1/5 longer than that of the shock absorber.

4. In a spring leg with load proportional limited damping for use on a vehicle, including a one-way telescoping shock absorber including a piston and cylinder and a load bearing air spring connected to a gas pressure system and having walls surrounding the air space thereof comprising two rigid walls fixed to the body and the axle of the vehicle and an elastic jacket connected to the two rigid walls, the improvement comprising means mounting the cylinder for movement relative to one of the two rigid walls comprising an auxiliary diaphragm having an inner rim fixed to the cylinder of the shock absorber and an outer rim fixed to said one of the two rigid walls of the air spring to define the auxiliary diaphragm as one of the bordering walls of the air space of the air spring, means for limiting the outward movement of the cylinder of the shock absorber from the air space of the air spring, the limiting means comprising a stop fixed to the cylinder of the shock absorber and a first counter stop fixed to the one rigid wall bearing the outer rim of the auxiliary diaphragm, means for limiting the inward movement of the cylinder of the shock absorber into the air space of the air spring relative to the one rigid wall sealingly bearing the outer rim of the auxiliary diaphragm, comprising said stop and a second counter stop fixed to said one rigid wall and wherein the piston rod of the shock absorber is fixed to the other rigid wall of the air spring.

5. A spring leg according to claim 4, wherein both the elastic jacket of the air spring and the auxiliary diaphragm comprise rolling diaphragms, the one rigid wall is connected to the vehicle axle and forms a piston for the air spring with the rolling diaphragms sealingly connected to a rim of the piston, the other rigid wall is connected to the vehicle body, the piston rod of the shock absorber is connected to the rigid wall of the air spring which is connected to the body, and wherein in the rim of the piston of the air spring there is a slot bearing the two counter stops which encircle the stop of the shock absorber formed as a stop collar and includes a channel which connects the air spaces divided by the rim of the piston of the air spring.

6. A spring leg according to claim 4, wherein the stroke of the spring leg is about 1/5 longer than that of the shock absorber.

* * * * *

UNITED STATES PATENT OFFICE
CERTIFICATE OF CORRECTION

Patent No. 4,325,541                                   Dated April 20, 1982

Inventor(s) Jozsef Körösladányi et al.

It is certified that error appears in the above-identified patent and that said Letters Patent are hereby corrected as shown below:

On the title page, Item /75/ should read:-/75/ Inventors:

József Körösladányi, Sándor Szabó, Jenö Mádi, László Vad and Ottó Farkas.-

Signed and Sealed this

Tenth Day of May 1983

[SEAL]

Attest:

GERALD J. MOSSINGHOFF

*Attesting Officer*                    *Commissioner of Patents and Trademarks*